United States Patent [19]

Przelomiec et al.

[11] Patent Number: 5,722,078
[45] Date of Patent: Feb. 24, 1998

[54] METHOD AND APPARATUS FOR LOCATING A DIGITAL CONTROL CHANNEL IN A DOWNBANDED CELLULAR RADIOCOMMUNICATION SYSTEM

[75] Inventors: Thomas A. Przelomiec, Lynchburg, Va.; Alex K. Raith, Durham, N.C.

[73] Assignee: Ericsson Inc., Research Triangle Park, N.C.

[21] Appl. No.: 622,403

[22] Filed: Mar. 27, 1996

Related U.S. Application Data

[63] Continuation-in-part of Ser. No. 331,711, Oct. 31, 1994, which is a continuation-in-part of Ser. No. 147,254, Nov. 1, 1993, Pat. No. 5,603,081.

[51] Int. Cl.$^6$ ............................................. H04Q 7/22
[52] U.S. Cl. ............................................. 455/452; 455/513
[58] Field of Search ............................ 370/95.1, 95.2, 370/95.3; 455/34.1, 33.1, 34.2, 54.1, 54.2, 62, 33.2, 422, 450–452, 517, 509, 511–513, 522–533; 379/59, 60, 63

[56] References Cited

U.S. PATENT DOCUMENTS

| | | |
|---|---|---|
| 4,527,284 | 7/1985 | Röttger . |
| 4,551,852 | 11/1985 | Grauel et al. . |
| 4,633,509 | 12/1986 | Scheinert . |
| 4,850,033 | 7/1989 | Eizenhöfer . |
| 4,876,738 | 10/1989 | Selby . |
| 5,093,926 | 3/1992 | Sasuta . |
| 5,119,397 | 6/1992 | Dahlin et al. ............... 375/5 |
| 5,182,753 | 1/1993 | Dahlin et al. . |
| 5,200,957 | 4/1993 | Dahlin . |
| 5,257,401 | 10/1993 | Dahlin et al. . |
| 5,353,332 | 10/1994 | Raith et al. ............... 379/59 |
| 5,377,193 | 12/1994 | Grube et al. . |
| 5,418,839 | 5/1995 | Knuth et al. ............... 379/61 |
| 5,504,939 | 4/1996 | Mayrand et al. ............... 455/34.1 |
| 5,507,034 | 4/1996 | Bodin et al. ............... 455/34.1 |

FOREIGN PATENT DOCUMENTS

| | | |
|---|---|---|
| 2060428 | 8/1992 | Canada . |
| 111972 | 6/1984 | European Pat. Off. . |

(List continued on next page.)

OTHER PUBLICATIONS

European Standard Search Report No. RS 95379, Date of completion: 23 Oct. 1995.
B.-M. Fingerle, "GSM *Signalisierung in der Praxis*", ITG Fachbericht 124, Mobile Kommunikation, pp. 423–432 (27–29 Sep. 1993).
European Standard Search Report No. RS 95770, Date of completion: 23 Oct. 1995.
European Standard Search Report No. RS 95769, Date of completion: 23 Oct. 1995.
PCT International Search Report regarding PCT/US94/12648; Date of mailing: 13 Mar. 1994.
"*A New Standard for North American Digital Cellular*", Magnus Isaksson et al., Ericsson Review, No. 2, pp. 58–59 (1994).

(List continued on next page.)

*Primary Examiner*—Douglas W. Olms
*Assistant Examiner*—Ajit Patel
*Attorney, Agent, or Firm*—Burns, Doane, Swecker Swecker & Mathis, L.L.P.

[57] ABSTRACT

A method and system for locating control channels, particularly digital control channels, are described. By grouping the channels which are candidates for carrying supervisory messages in blocks indicative of their relative likelihood for being used as control channels, a mobile station can begin its search for a control channel with channels which are most likely to actually be control channels.

17 Claims, 8 Drawing Sheets

FOREIGN PATENT DOCUMENTS

| | | |
|---|---|---|
| 167331 | 1/1986 | European Pat. Off. . |
| 240073 | 10/1987 | European Pat. Off. . |
| 4211815 | 10/1993 | Germany . |
| 6-284075 | 10/1994 | Japan . |
| 2259633 | 3/1993 | United Kingdom . |

OTHER PUBLICATIONS

"*Cellular System Dual–Mode Mobile Station–Base Station Compatibility Standard*", EIA/TIA Interim Standard, IS–54–B, pp. 101–106; 109–116; 139–140 and 163–166 (Apr. 1992).

"*Mobile Station–Base Station Standard for Dual–Mode Wideband Spread Spectrum Cellular System*", TIA/EIA Interim Standard, TIA/EIA/IS–95, pp. 2–13, 2–31, 6–7 to 6–12, 6–66 to 6–69, 7–1 to 7–6 (Jul. 1993).

"*TDMA Radio Link Control Techniques and Development of a Digital Cellular System*", IEICE Transactions on Fundamentals of Electronics, Communications and Computer Sciences, vol. E75–A, No. 12, Dec. 1992.

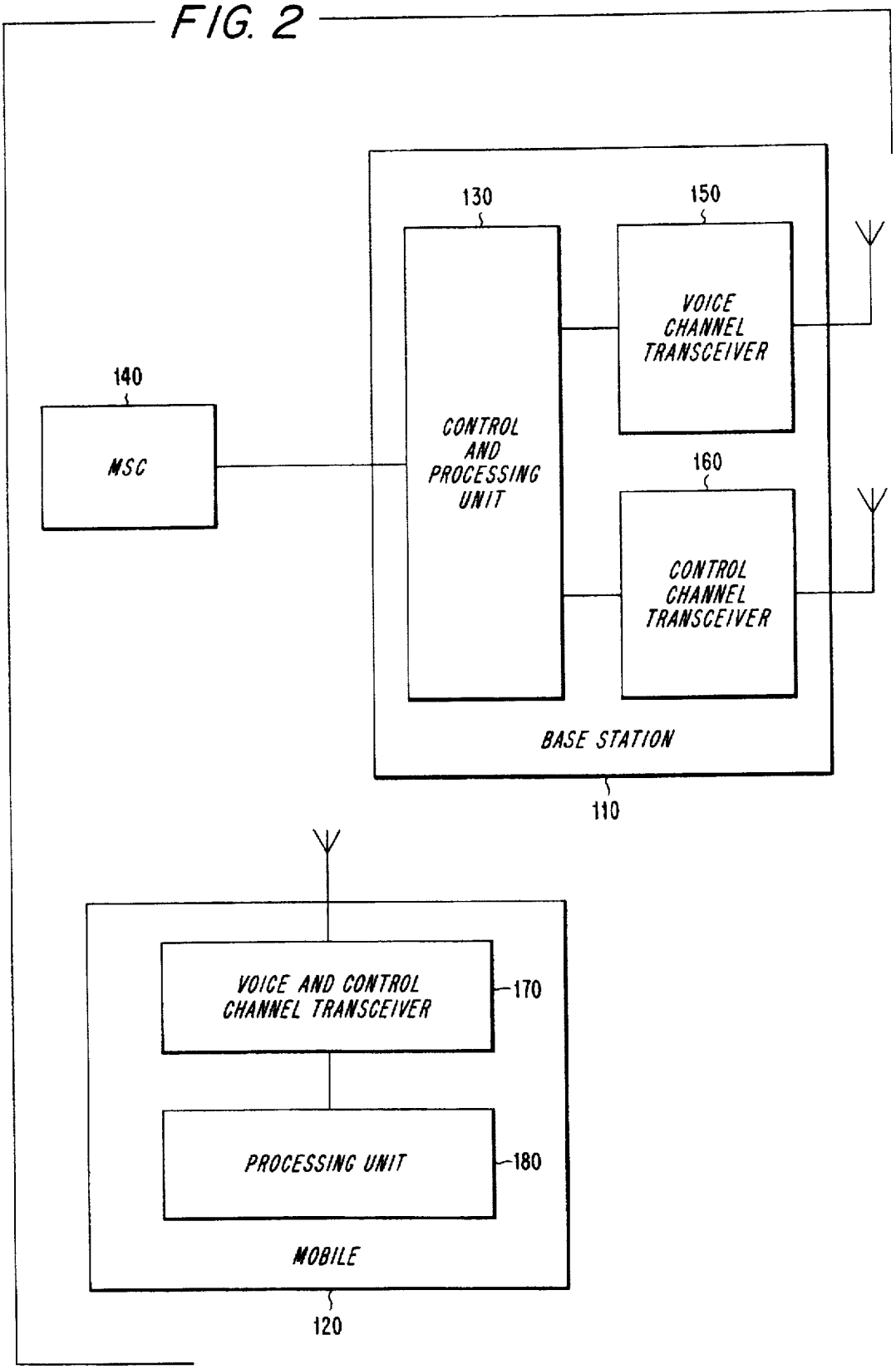

FIG. 3

| BLOCK # | START CHN | END CHN | NUM CHAN | TX BOT | TX TOP | RELATIVE PROBABILITY | |
|---|---|---|---|---|---|---|---|
| 1 | 1 | 45 | 45 | 851.01 | 852.33 | 16 | LOWEST |
| 2 | 46 | 82 | 37 | 852.36 | 853.44 | 12 | |
| 3 | 83 | 119 | 37 | 853.47 | 854.55 | 11 | |
| 4 | 120 | 156 | 37 | 854.58 | 855.66 | 10 | |
| 5 | 157 | 193 | 37 | 855.69 | 856.77 | 6 | |
| 6 | 194 | 230 | 37 | 856.8 | 857.88 | 2 | |
| 7 | 231 | 267 | 37 | 857.91 | 858.99 | 4 | |
| 8 | 268 | 304 | 37 | 859.02 | 860.1 | 8 | |
| 9 | 305 | 341 | 37 | 860.13 | 861.21 | 9 | |
| 10 | 342 | 378 | 37 | 861.24 | 862.32 | 1 | HIGHEST |
| 11 | 379 | 415 | 37 | 862.35 | 863.43 | 3 | |
| 12 | 416 | 452 | 37 | 863.46 | 864.54 | 5 | |
| 13 | 453 | 489 | 37 | 864.57 | 865.65 | 7 | |
| 14 | 490 | 526 | 37 | 865.68 | 866.76 | 13 | |
| 15 | 527 | 563 | 37 | 866.79 | 867.87 | 14 | |
| 16 | 564 | 600 | 37 | 867.9 | 868.98 | 15 | |

FIG. 4

| BLOCK # | START CHN | RCI=2 END CHN | # CHAN GRPS = 3 NUM CHAN | LMR BAND | TX BOT | TX TOP | RELATIVE PROBABILITY | |
|---|---|---|---|---|---|---|---|---|
| 1 | 1 | 17 | 17 | A | 851.01 | 851.49 | 16 | LOWEST |
| 2 | 18 | 27 | 10 | A | 851.52 | 851.79 | 13 | |
| 3 | 28 | 37 | 10 | A | 851.82 | 852.09 | 11 | |
| 4 | 38 | 47 | 10 | A | 852.12 | 852.39 | 8 | |
| 5 | 48 | 57 | 10 | A | 852.42 | 852.69 | 6 | |
| 6 | 58 | 67 | 10 | A | 852.72 | 852.99 | 4 | |
| 7 | 68 | 77 | 10 | A | 853.02 | 853.29 | 2 | |
| 8 | 78 | 87 | 10 | A | 853.32 | 853.59 | 1 | HIGHEST |
| 9 | 88 | 97 | 10 | A | 853.62 | 853.89 | 3 | |
| 10 | 98 | 107 | 10 | A | 853.92 | 854.19 | 5 | |
| 11 | 108 | 117 | 10 | A | 854.22 | 854.49 | 7 | |
| 12 | 118 | 127 | 10 | A | 854.52 | 854.79 | 9 | |
| 13 | 128 | 137 | 10 | A | 854.82 | 855.09 | 10 | |
| 14 | 138 | 147 | 10 | A | 855.12 | 855.39 | 12 | |
| 15 | 148 | 157 | 10 | A | 855.42 | 855.69 | 14 | |
| 16 | 158 | 167 | 10 | A | 855.72 | 855.99 | 15 | |
| 1 | 168 | 185 | 18 | B | 856.02 | 856.53 | 16 | LOWEST |
| 2 | 186 | 206 | 21 | B | 856.56 | 857.16 | 14 | |
| 3 | 207 | 227 | 21 | B | 857.19 | 857.79 | 13 | |
| 4 | 228 | 248 | 21 | B | 857.82 | 858.42 | 11 | |
| 5 | 249 | 269 | 21 | B | 858.45 | 859.05 | 8 | |
| 6 | 270 | 290 | 21 | B | 859.08 | 859.68 | 6 | |
| 7 | 291 | 311 | 21 | B | 859.71 | 860.31 | 4 | |
| 8 | 312 | 332 | 21 | B | 860.34 | 860.94 | 2 | |
| 9 | 333 | 353 | 21 | B | 860.97 | 861.57 | 1 | HIGHEST |
| 10 | 354 | 374 | 21 | B | 861.6 | 862.2 | 3 | |
| 11 | 375 | 395 | 21 | B | 862.23 | 862.83 | 5 | |
| 12 | 396 | 416 | 21 | B | 862.86 | 863.46 | 7 | |
| 13 | 417 | 437 | 21 | B | 863.49 | 864.09 | 9 | |
| 14 | 438 | 458 | 21 | B | 864.12 | 864.72 | 10 | |
| 15 | 459 | 479 | 21 | B | 864.75 | 865.35 | 12 | |
| 16 | 480 | 500 | 21 | B | 865.38 | 865.98 | 15 | |
| 1 | 501 | 510 | 10 | C | 866.01 | 866.28 | 16 | LOWEST |
| 2 | 511 | 516 | 6 | C | 866.31 | 866.46 | 13 | |
| 3 | 517 | 522 | 6 | C | 866.49 | 866.64 | 11 | |
| 4 | 523 | 528 | 6 | C | 866.67 | 866.82 | 8 | |
| 5 | 529 | 534 | 6 | C | 866.85 | 867 | 6 | |
| 6 | 535 | 540 | 6 | C | 867.03 | 867.18 | 4 | |
| 7 | 541 | 546 | 6 | C | 867.21 | 867.36 | 2 | |
| 8 | 547 | 552 | 6 | C | 867.39 | 867.54 | 1 | HIGHEST |
| 9 | 553 | 558 | 6 | C | 867.57 | 867.72 | 3 | |
| 10 | 559 | 564 | 6 | C | 867.75 | 867.9 | 5 | |
| 11 | 565 | 570 | 6 | C | 867.93 | 868.08 | 7 | |
| 12 | 571 | 576 | 6 | C | 868.11 | 868.26 | 9 | |
| 13 | 577 | 582 | 6 | C | 868.29 | 868.44 | 10 | |
| 14 | 583 | 588 | 6 | C | 868.47 | 868.62 | 12 | |
| 15 | 589 | 594 | 6 | C | 868.65 | 868.8 | 14 | |
| 16 | 595 | 600 | 6 | C | 868.83 | 868.98 | 15 | |

FIG. 5(a)

| BLOCK # | START CHN | END CHN | RCI=2 NUM CHAN | # CHAN GRPS=4 LMR BAND | TX BOT | TX TOP | RELATIVE PROBABILITY |
|---|---|---|---|---|---|---|---|
| 1 | 1 | 17 | 17 | A | 851.01 | 851.49 | 16 |
| 2 | 18 | 27 | 10 | A | 851.52 | 851.79 | 13 |
| 3 | 28 | 37 | 10 | A | 851.82 | 852.09 | 11 |
| 4 | 38 | 47 | 10 | A | 852.12 | 852.39 | 8 |
| 5 | 48 | 57 | 10 | A | 852.42 | 852.69 | 6 |
| 6 | 58 | 67 | 10 | A | 852.72 | 852.99 | 4 |
| 7 | 68 | 77 | 10 | A | 853.02 | 853.29 | 2 |
| 8 | 78 | 87 | 10 | A | 853.32 | 853.59 | 1 |
| 9 | 88 | 97 | 10 | A | 853.62 | 853.89 | 3 |
| 10 | 98 | 107 | 10 | A | 853.92 | 854.19 | 5 |
| 11 | 108 | 117 | 10 | A | 854.22 | 854.49 | 7 |
| 12 | 118 | 127 | 10 | A | 854.52 | 854.79 | 9 |
| 13 | 128 | 137 | 10 | A | 854.82 | 855.09 | 10 |
| 14 | 138 | 147 | 10 | A | 855.12 | 855.39 | 12 |
| 15 | 148 | 157 | 10 | A | 855.42 | 855.69 | 14 |
| 16 | 158 | 167 | 10 | A | 855.72 | 855.99 | 15 |
| 1 | 168 | 184 | 17 | B | 856.02 | 856.5 | 16 |
| 2 | 185 | 194 | 10 | B | 856.53 | 856.8 | 13 |
| 3 | 195 | 204 | 10 | B | 856.83 | 857.1 | 11 |
| 4 | 205 | 214 | 10 | B | 857.13 | 857.4 | 8 |
| 5 | 215 | 224 | 10 | B | 857.43 | 857.7 | 6 |
| 6 | 225 | 234 | 10 | B | 857.73 | 858 | 4 |
| 7 | 235 | 244 | 10 | B | 858.03 | 858.3 | 2 |
| 8 | 245 | 254 | 10 | B | 858.33 | 858.6 | 1 |
| 9 | 255 | 264 | 10 | B | 858.63 | 858.9 | 3 |
| 10 | 265 | 274 | 10 | B | 858.93 | 859.2 | 5 |
| 11 | 275 | 284 | 10 | B | 859.23 | 859.5 | 7 |
| 12 | 285 | 294 | 10 | B | 859.53 | 859.8 | 9 |
| 13 | 295 | 304 | 10 | B | 859.83 | 860.1 | 10 |
| 14 | 305 | 314 | 10 | B | 860.13 | 860.4 | 12 |
| 15 | 315 | 324 | 10 | B | 860.43 | 860.7 | 14 |
| 16 | 325 | 334 | 10 | B | 860.73 | 861 | 15 |

FIG. 5(b)

| BLOCK # | START CHN | END CHN | NUM CHAN | LMR BAND | TX BOT | TX TOP | PROBABILITY |
|---|---|---|---|---|---|---|---|
| 1 | 335 | 350 | 16 | C | 861.03 | 861.48 | 16 |
| 2 | 351 | 360 | 10 | C | 861.51 | 861.78 | 13 |
| 3 | 361 | 370 | 10 | C | 861.81 | 862.08 | 11 |
| 4 | 371 | 380 | 10 | C | 862.11 | 862.38 | 8 |
| 5 | 381 | 390 | 10 | C | 862.41 | 862.68 | 6 |
| 6 | 391 | 400 | 10 | C | 862.71 | 862.98 | 4 |
| 7 | 401 | 410 | 10 | C | 863.01 | 863.28 | 2 |
| 8 | 411 | 420 | 10 | C | 863.31 | 863.58 | 1 |
| 9 | 421 | 430 | 10 | C | 863.61 | 863.88 | 3 |
| 10 | 431 | 440 | 10 | C | 863.91 | 864.18 | 5 |
| 11 | 441 | 450 | 10 | C | 864.21 | 864.48 | 7 |
| 12 | 451 | 460 | 10 | C | 864.51 | 864.78 | 9 |
| 13 | 461 | 470 | 10 | C | 864.81 | 865.08 | 10 |
| 14 | 471 | 480 | 10 | C | 865.11 | 865.38 | 12 |
| 15 | 481 | 490 | 10 | C | 865.41 | 865.68 | 14 |
| 16 | 491 | 500 | 10 | C | 865.71 | 865.98 | 15 |
| 1 | 501 | 510 | 10 | D | 866.01 | 866.28 | 16 |
| 2 | 511 | 516 | 6 | D | 866.31 | 866.46 | 13 |
| 3 | 517 | 522 | 6 | D | 866.49 | 866.64 | 11 |
| 4 | 523 | 528 | 6 | D | 866.67 | 866.82 | 8 |
| 5 | 529 | 534 | 6 | D | 866.85 | 867 | 6 |
| 6 | 535 | 540 | 6 | D | 867.03 | 867.18 | 4 |
| 7 | 541 | 546 | 6 | D | 867.21 | 867.36 | 2 |
| 8 | 547 | 552 | 6 | D | 867.39 | 867.54 | 1 |
| 9 | 553 | 558 | 6 | D | 867.57 | 867.72 | 3 |
| 10 | 559 | 564 | 6 | D | 867.75 | 867.9 | 5 |
| 11 | 565 | 570 | 6 | D | 867.93 | 868.08 | 7 |
| 12 | 571 | 576 | 6 | D | 868.11 | 868.26 | 9 |
| 13 | 577 | 582 | 6 | D | 868.29 | 868.44 | 10 |
| 14 | 583 | 588 | 6 | D | 868.47 | 868.62 | 12 |
| 15 | 589 | 594 | 6 | D | 868.65 | 868.8 | 14 |
| 16 | 595 | 600 | 6 | D | 868.83 | 868.98 | 15 |

METHOD AND APPARATUS FOR LOCATING A DIGITAL CONTROL CHANNEL IN A DOWNBANDED CELLULAR RADIOCOMMUNICATION SYSTEM

RELATED APPLICATIONS

This application is a continuation-in-part of U.S. patent application Ser. No. 08/331,711, entitled "A Method and Apparatus for Locating a Digital Control Channel in a Radiocommunication System", filed on Oct. 31, 1994, which is a continuation-in-part of U.S. patent application Ser. No. 08/147,254 entitled "A Method for Communicating in a Wireless Communication System", filed on Nov. 1, 1993 now U.S. Pat. No. 5,603,081. The disclosure of both of these patent applications is expressly incorporated here by reference.

BACKGROUND

The present invention relates generally to radiocommunication systems having control channels and, more particularly, to the location of digital control channels in downbanded cellular radiocommunication systems.

Cellular systems have traditionally been analog in nature. The rapid growth of radiocommunication systems, however, has compelled system designers to search for ways in which system capacity can be increased without reducing communication quality beyond consumer tolerance thresholds. One way in which increased capacity can be provided is by changing from analog to digital communication techniques. In North America, this change was implemented by transitioning from systems specified by the analog AMPS standard to digital systems (D-AMPS) which has been standardized in technical requirements documents promulgated by the Telecommunications Industry Association, specifically TIA/EIA IS-54B and, subsequently, IS-136.

Since a large consumer base having equipment that operated only in the analog domain existed prior to the introduction of digital techniques, a dual-mode (analog and digital) Cellular standard was adopted in IS-54B so that analog compatibility was provided in tandem with digital communication capability. For example, the IS-54B standard provides for both analog and digital traffic channels, wherein the system operator can replace analog traffic channels with digital traffic channels, and vice-versa, in a dynamic manner to accommodate fluctuating traffic patterns among analog and digital users.

In addition to traffic channels, Cellular systems also provide control channels which are used to carry call setup data messages between base stations and mobile stations. According to IS-54B, for example, there are 21 dedicated analog control channels which are assigned to fixed frequencies for each of the A and B carriers. These analog control channels are termed "dedicated" since they are always found at the same frequency and, therefore, can be readily located by the mobile stations which need to monitor the data which is transmitted thereon.

For example, when in the idle state (i.e., turned on but not in use), a mobile station in a Cellular system designed in accordance with IS-54B tunes to and then continuously monitors the strongest control channel at its known frequency (generally, the control channel of the cell in which the mobile station is located at that moment) and may receive or initiate a telephone call through the corresponding base station. When moving between cells while in the idle state, the mobile station will eventually "lose" radio connection on the control channel of the "old" cell and tune to the control channel of the "new" cell. The initial tuning to, and the change of, control channel are both accomplished automatically by scanning all the control channels at their known frequencies in the Cellular system to find the "best" control channel. When a control channel with good reception quality is found, the mobile station remains tuned to this channel until the quality deteriorates again. In this manner, all mobile stations are nearly always "in touch" with the system.

As such hybrid systems mature, it is anticipated that the number of analog users will diminish and the number of digital users will increase. Eventually all of the analog traffic channels will probably be replaced by digital traffic channels. When that occurs, less expensive digital-only mobile units can replace the current dual-mode units. However, such digital-only mobile units would be unable to scan the analog control channels currently provided in the IS-54B system.

Accordingly, it is desirable to provide digital control channels to radiocommunication systems which support digital technology, such as that described by IS-136. In addition to compatibility issues, digital control channels are also desirable for other reasons described in the above-identified applications, for example an enhanced sleep mode for mobile units which results in longer battery life. Whereas IS-54B provides control channels on fixed frequencies, more flexibility is desirable in assigning the number of control channels and the frequencies for these control channels to optimize system capacity and to support hierarchical cell structures, i.e., microcells, picocells, etc. If, however, the digital control channels are not located on known frequencies, the question arises as to how the remote units will be able to locate these control channels for monitoring. The parent application (U.S. patent application Ser. No. 08/331,711) describes several exemplary techniques for locating digital control channels which may be assigned to arbitrary frequencies within the Cellular frequency bands.

Even with the implementation of more spectrally efficient technologies, the capacity of Cellular communication systems continues to be a concern due to the unexpectedly rapid growth in subscriber bases. Another way in which the capacity of Cellular communications system can be increased is to provide additional spectrum. For example, the FCC originally allocated two blocks of frequencies (i.e., 825–845 MHz (uplink) and 870–890 MHz (downlink)) for Cellular service in the United States. In 1987, the FCC allocated an additional 5 MHz to each block to increase Cellular system capacity in response to consumer demand. Of course, this solution has natural limits since the usable frequency spectrum is limited and other, existing communication systems already own some of the spectrum bandwidth.

Another solution is described in U.S. patent application Ser. No. 08/622,311, entitled "Downbanded Cellular Systems and Methods", filed on the same day as this application, the disclosure of which is expressly incorporated here by reference. Therein, techniques are described for adapting the portion of the spectrum allocated by the FCC to Land Mobile Radio (LMR) for usage as additional downbanded cellular (DBC) channels to supplement and/or complement the capacity achievable using only the Cellular bandwidth. As used herein, the term "Downbanded Cellular" generally pertains to the use of Cellular techniques in non-standard spectrum ranges. LMR systems are typically used to provide radio communication service between individual units of a particular organization. For example, police departments use a version of LMR (commonly referred to as public service trunked (PST) systems) to communicate between patrol cars and headquarters. Unlike Cellular systems, however, LMR systems have historically been implemented as large independent sites serviced by one (or a few) transmitting base stations, rather than over a wide geographical area serviced by many transmitting base stations as in Cellular systems. At each LMR site, an operator is allocated a portion of the LMR spectrum within which the operator selects a fixed frequency to be used for the control channel while all of the other frequencies can be used for traffic. Thus, in conventional LMR systems a remote unit is typically programmed with a primary control channel frequency to which it locks when turned on or reset. Alternate control channel frequencies can also be programmed into the remote units to accommodate situations where the primary control channel is malfunctioning or taken out of service (e.g. for maintenance of the transmitting unit).

If, however, the LMR spectrum is to be used to provide downbanded cellular capability that is compatible with existing standards for digital control channels (e.g., TIA/EIA IS-136) as described in the "Downbanded Cellular Systems and Methods" patent application, there exists a need for providing remote units which are capable of locating such digital control channels regardless of which frequencies (e.g., LMR or Cellular band) are used to support these control channels.

SUMMARY

These and other drawbacks and limitations of conventional systems and methods are overcome according to the present invention wherein digital control channel location is expedited by, for example, prescribing a search pattern based on a relative likelihood of finding a digital control channel on a particular DBC channel or group of DBC channels. According to exemplary embodiments of the present invention, channels are grouped into probability blocks which are ranked in accordance with the relative likelihood of finding the digital control channel in each block. A mobile unit can then look for a digital control channel within a highest ranked probability block, followed by a second highest ranked probability block and so on, until a digital control channel is located. This process can, for example, be used when the mobile station has no information regarding the frequency which is being used as a control channel in the mobile station's current geographic location, e.g., the first time that a mobile station is turned on in a new area.

According to another exemplary embodiment of the present invention, after initial control channel acquisition a predetermined number of control channel frequencies are stored in a memory of the mobile unit. Control channel frequencies can be stored on an as-acquired basis or on an as-identified basis, depending upon a user's preference. For example, each time the mobile station actually locks onto a control channel (i.e., selects a control channel as the active control channel) that control channel can be stored in a FIFO buffer. If stored on an as-identified basis, control channel frequencies can also be added to the FIFO buffer when the mobile station is informed of other control channels, e.g., when it receives a neighbor list for cell reselection measurement. The stored list is then used the next time that the mobile station is turned on to expedite control channel acquisition.

BRIEF DESCRIPTION OF THE DRAWINGS

The foregoing, and other, objects, features and advantages of the present invention will be more readily understood upon reading the following detailed description in conjunction with the drawings in which:

FIG. 2 is a block diagram of a portion of an exemplary radio communication system according to the present invention;

FIG. 3 is a table which shows a first exemplary probability block scheme according to the present invention;

FIG. 4 is a table which shows a second exemplary probability block scheme according to the present invention;

FIG. 5(a) shows a portion of a third exemplary probability block scheme according to the present invention;

FIG. 5(b) completes the table of FIG. 5(a);

DETAILED DESCRIPTION

Figure 1A:
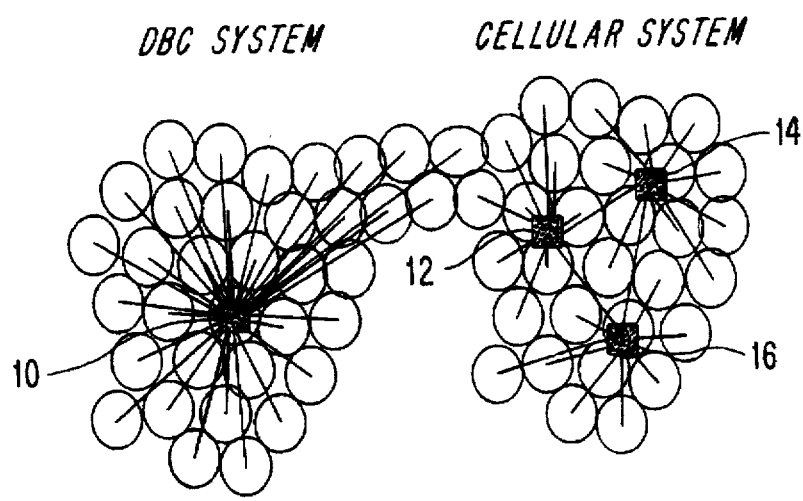
FIG. 1(a) illustrates a DBC system adjacent to a Cellular system.

FIG. 1(a) illustrates one contemplated application of DBC systems. In the figure, a DBC system is positioned adjacent to a Cellular system. The DBC system is illustrated as having a plurality of cells each of which are supported by a mobile switching center (MSC) 10. Similarly, the Cellular system has a plurality of cells supported by three MSCs 12, 14 and 16. Each cell includes one or more base stations (not shown) connected to its respective MSC for transmitting signals to, and receiving signals from, mobile stations within the cell. In this exemplary configuration, the DBC system provides additional geographic coverage which would allow, for example, the operator of the Cellular system to provide greater geographic service to its customers.

Figure 1B:
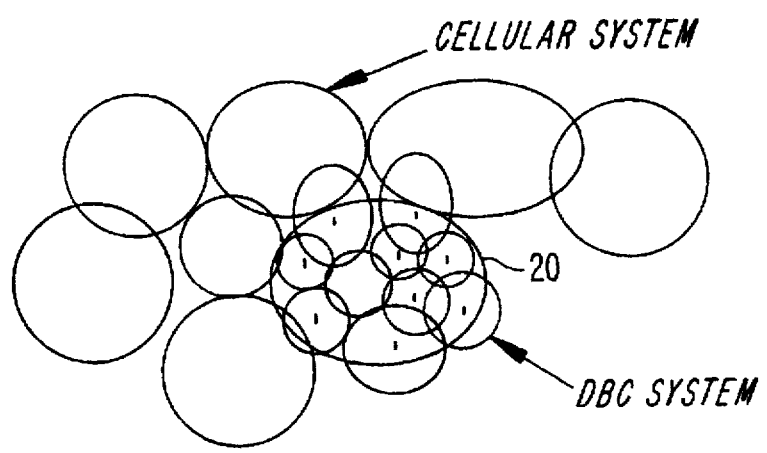
FIG. 1(b) illustrates a DBC system that is physically coincident with a Cellular system.

Another example is illustrated in FIG. 1(b). Therein, each of the larger circles and ellipses represents a Cellular system and each of the smaller circles within Cellular system 20 represents a DBC system. Thus, this example illustrates a case where DBC systems are coincident with a Cellular system and can be used to supplement the Cellular system's capacity.

Having described exemplary applications of DBC systems at a cell level, some general details of base stations and mobile stations are provided to round out this discussion, but without providing an unnecessary amount of detail that might obscure the present invention. Those skilled in the art will appreciate that DBC base stations and mobile stations can be manufactured using substantially the same components as conventional Cellular base stations and mobile stations, with certain exceptions, e.g., DBC equipment will have the rf capability to operate in the LMR frequency band. Readers interested in obtaining additional information relating to more specific details of exemplary mobile and base station implementations are directed to copending U.S. patent application Ser. No. 07/967,027 entitled "Multi-Mode Signal Processing" filed on Oct. 27, 1992 to P. Dent and B. Ekelund, which disclosure is incorporated here by reference.

FIG. 2 represents a block diagram of a portion of an exemplary downbanded cellular radiocommunication system according to one embodiment of the present invention which can be used to implement the foregoing. The system shows an exemplary base station 110 and a mobile 120. The base station includes a control and processing unit 130 which is connected to the MSC 140 which in turn is connected to the public switched telephone network (not shown).

The base station 110 for a cell includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver handles the traffic or voice channels. When the mobile 120 first enters the idle mode, it will locate a DBC control channel from which it can acquire overhead information and listen for pages. In conventional LMR systems, a control channel was identified by the processing unit 180 tuning the mobile station's voice/control channel transceiver 170 to a control channel, which control channel has been preprogrammed into the mobile station by the network operator. This technique, however, is not appropriate for DBC systems in which control channels can be placed on any DBC channel frequency.

According to exemplary embodiments of the present invention, several techniques can be used to expedite the acquisition of a DBC control channel by the mobile station. One technique which can be used to aid the mobile in searching for a digital control channel is to group the available frequencies into blocks which are assigned different probabilities that reflect the relative likelihood of finding a digital control channel in each block. In this manner, the time required for service acquisition by the mobile station may be significantly decreased as compared with, for example, starting with a first numbered channel in the LMR spectrum and reading each channel in numbered order until a control channel is found. The table depicted in FIG. 3 is one example of how the channels in the LMR hyperband can be assigned different relative probabilities for supporting digital control channel acquisition. In this example, the LMR spectrum is divided into 16 blocks all but the first (lowest probability) of which include 37 channels. Both channel numbers and transmit frequencies are provided. Readers interested in how these frequencies were determined and other aspects of DBC channelization of the LMR spectrum are referred to the above-incorporated patent application entitled "Downbanded Cellular Systems and Methods". A mobile station using the exemplary probability block scheme of FIG. 3 would first scan the channels in block #10. If a control channel is not located within this first block of 37 channels, then the mobile station would next scan the channels associated with block #6, and so on until a DBC control channel is found. A more detailed example of this process is provided below.

FIG. 4, and FIGS. 5(a) and 5(b) jointly, present two other examples of ways in which the LMR portion of the spectrum can be grouped into probability blocks of frequencies. For example, the probability block scheme illustrated in FIG. 4 can be used if the LMR spectrum is separated into three different bands or channel groups so that a mobile station looks for a control channel in its assigned band. Similarly, FIGS. 5(a) and 5(b) provide an exemplary probability block scheme for the LMR spectrum should it be subdivided into four channel groups as shown. Those skilled in the art will appreciate that these channel groupings are merely exemplary and that any other groupings could be accommodated using the disclosed techniques. These probability block techniques can be used by a mobile station as a starting point for digital control channel location when, for example, the mobile station first powers on in a DBC system or at any other time that the mobile station cannot locate a control channel using other information. An example of how other control channel information can be obtained by a mobile station and used to further reduce control channel acquisition time is described below.

Figure 6:
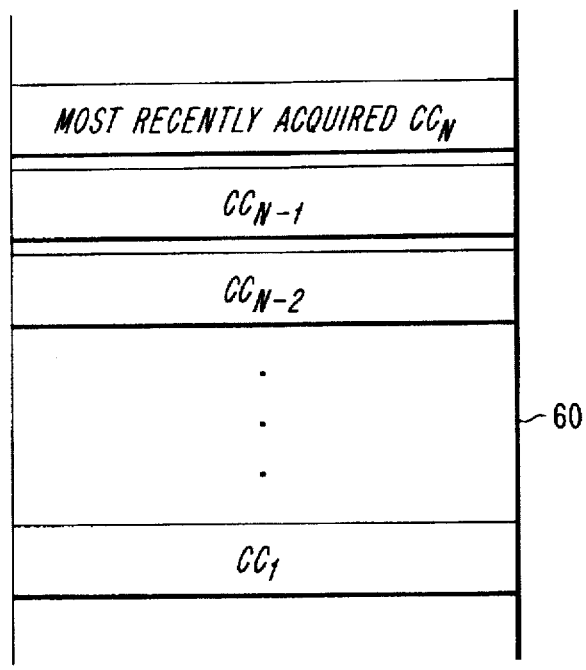
FIG. 6 illustrates an exemplary FIFO buffer which can be used to reduce control channel acquisition time according to an exemplary embodiment of the present invention.

According to another aspect of the present invention, a FIFO based control channel scanning list is retained in the mobile station to further expedite control channel acquisition. According to one exemplary embodiment, illustrated in FIG. 6, a FIFO buffer 60 can be provided in the mobile station which stores the last N (e.g., 24) control channels (CCs) which have been locked to by the mobile station. For example, as a mobile station in the idle mode moves from one cell to another, it will lock onto the control channel associated with the new cell using well known cell reselection techniques. The newly acquired control channel will be input to the FIFO buffer, thereby displacing all of the current entries in the FIFO buffer 60 by one. If the FIFO buffer 60 is full, then the twenty-fourth entry will be displaced out of the buffer. DBC mobile stations can use the list of control channels as follows. When a mobile station is activated, it will first check the FIFO buffer 60 to determine if any control channels are listed therein and will attempt to lock on to the listed control channels in the order that they are stored in the FIFO (i.e., N to 1). If, as is frequently the case, a subscriber travels within a repeated pattern of cells, then it is likely that one of the N stored control channels will be accessible at power on of the mobile station. Alternatively, if the mobile station cannot locate any of the control channels identified in the FIFO buffer 60, or if no control channels are listed in the FIFO buffer 60, then the mobile station will use the above-described techniques for finding control channels using a stored probability block scheme.

According to another exemplary embodiment of the present invention, the FIFO buffer 60 will not only store those control channels that the mobile station has acquired, but also any other control channels of which it becomes aware. For example, the network may forward a neighboring list of control channels which are associated with base stations adjacent cells. This neighboring list may be used for measurement purposes to determine, for example, when the mobile station should reselect another cell's control channel. In any event, this neighboring list of control channels can also be added to the FIFO buffer for storage and later use in control channel acquisition as described above. The desirability of adding control channels which are identified but not acquired may depend on the movement patterns of each mobile station and, therefore, may be added to the FIFO buffer 60 at the user's option by way of a selectable menu item provided as part of the user interface of the mobile station.

Figure 7:
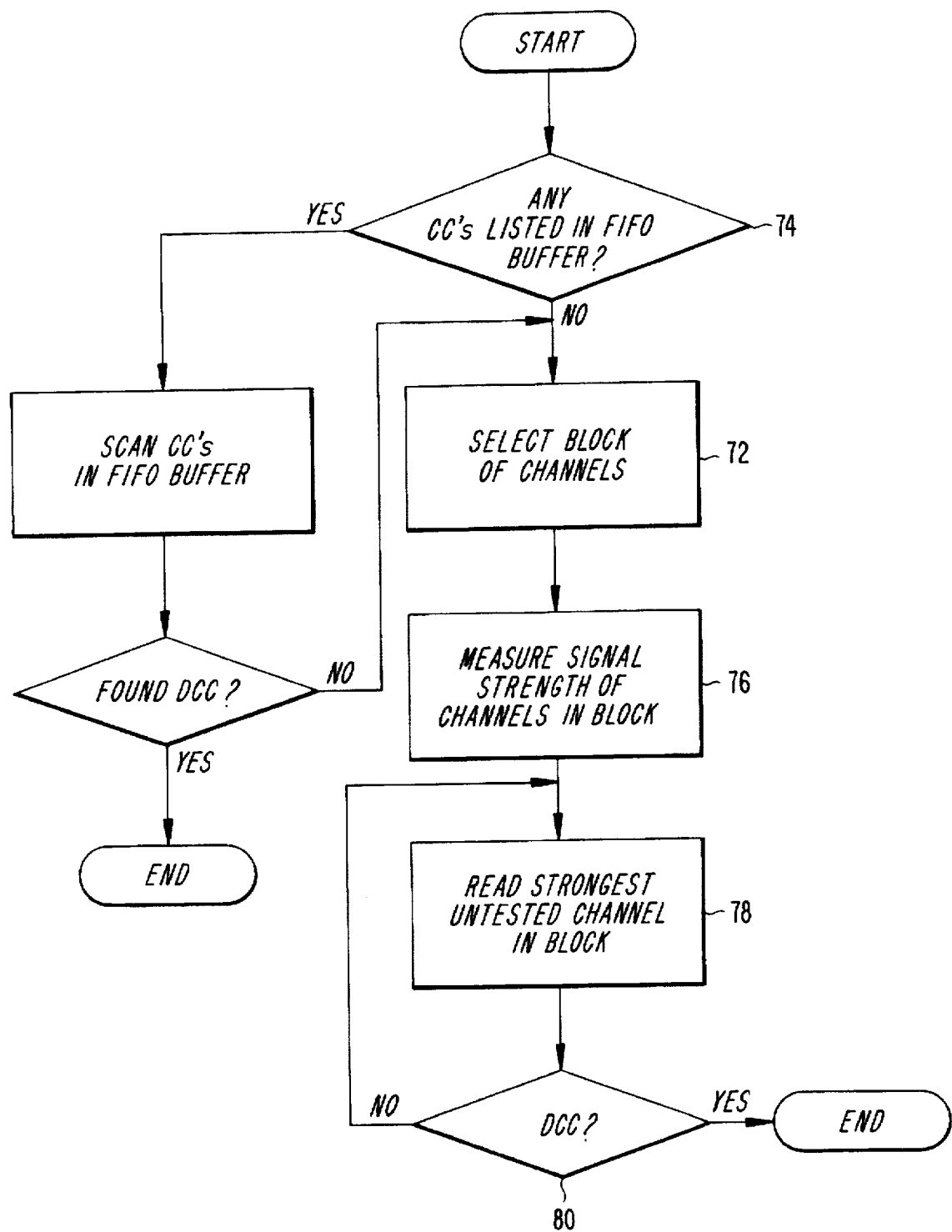
FIG. 7 is a flow chart illustrating an exemplary method for acquiring control channels according to the present invention.

Having described exemplary techniques which can be used to expedite the location of a DBC control channel, other exemplary embodiments of the present invention will now be described wherein these techniques are applied in various situations. For example, and with reference to the flow chart of FIG. 7, suppose that a mobile station is seeking a DBC control channel on the A-Band of a DBC system in which the probability block scheme of FIG. 4 is employed. As shown at block 72, the mobile will first examine, assuming that no other information is available in the mobile station (block 74), the channels within the highest ranked probability block, for example, block #8 having channel numbers 78–87 in FIG. 4. Within this block of channels, the mobile will select a first channel to read based on some predetermined criteria. For example, as described in block 76, this criteria can be the measured signal strength of the channels within the probability block. Alternately, the channels could be read in numbered order within the block. Thus, the mobile measures the signal strength (RSSI) of channels 78–87 and ranks them in order from strongest to weakest. The highest signal strength channel, denoted channel 'X' for this discussion, is then selected for reading at block 78. In an all-digital system, this channel will either be a digital traffic channel (DTC) or a digital control channel (DCC). If the selected channel 'X' is identified as a DCC at block 80, then the process ends. If, on the other hand, channel 'X' is a DTC, then the flow returns to block 78 where the next highest ranked channel is selected for reading. The identification of a channel as either a DTC or DCC can be performed in a variety of ways.

Figure 8A:
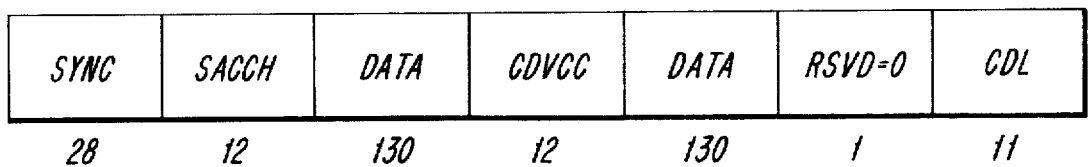
FIG. 8(a) is an exemplary frame format for a digital traffic channel.
Figure 8B:
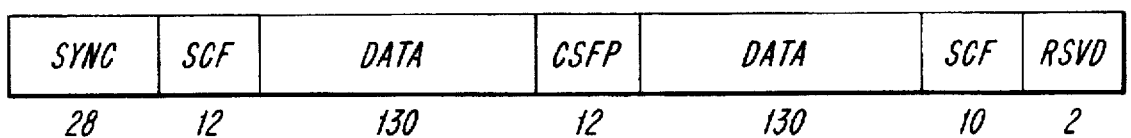
FIG. 8(b) is an exemplary frame format for a digital control channel.

As an example for distinguishing between a digital traffic channel and a digital control channel, the signalling format described in IS-54B standard will again be used as an illustrative reference. Although the IS-54B digital traffic channel and digital control channel downlink slot format have structural commonality, as seen in FIGS. 8(a) and 8(b), there are also certain differences which allow for distinguishing a digital control channel from a digital traffic channel. First, because of the differences in the channel coding of the digital verification color code (DVCC) and superframe (SFP) fields, there are always 4 bits out of 12 which are different in every pair of CDVCC and CSFP codewords regardless of which CDVCC or CSFP codeword is transmitted by a base station (bit errors introduced due to radio channel impairments, however, may change the extent to which transmitted codewords differ once they are received by a mobile station). More specifically, the four check bits of the SCFP are inverted relative to the check bits of the CDVCC. Secondly, the CDVCC content is fixed from slot to slot on a digital traffic channel whereas the content of the CSFP changes in a predictable fashion from slot to slot on a digital control channel.

Another distinction which could be used is that the channel coding and interleaving employed on a digital traffic channel is different from that employed on a digital control channel regardless of the DTC service (speech or FACCH). For example, the digital traffic channel might use ½ rate coding while the digital control channel uses ¼ rate coding. Moreover, the IS-54B SACCH and RESERVED fields have different functionality on a digital control channel. The actual function of each of the fields illustrated in FIGS. 8(a) and 8(b) is not germane to the present discussion, however, for a more detailed explanation of the functionality of these fields reference is made to the above-incorporated applications.

If one or more control channels are listed in the FIFO buffer 60 as determined at block 74, then the flow moves along the "yes" branch. At block 82, the mobile unit will then operate its transceiver to scan each of the control channels in FIFO buffer 60 in sequence. If a control channel is found at block 84, then the process ends. Otherwise, when all of the control channels identified in the FIFO buffer 60 had been eliminated from consideration, the mobile station will then revert to a probability block approach to locating a control channel as the flow moves to block 72.

The above-described exemplary embodiments are intended to be illustrative in all respects, rather than restrictive, of the present invention. Although the foregoing exemplary embodiments have been described in terms of base and mobile stations, the present invention can be applied to any radiocommunication system. For example, satellites could transmit and receive data in communication with the remote devices using DBC channels.

Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A method for locating a Downbanded Cellular (DBC) control channel among a plurality of DBC traffic and control channels comprising the steps of:

grouping said plurality of DBC channels into a plurality of blocks;

ranking each of said blocks based upon a relative likelihood of finding said DBC control channel therein; and investigating DBC channels within a highest ranked block to locate a DBC control channel.

2. The method of claim 1, wherein said plurality of DBC channels have center frequencies in the range between 851 and 869 MHz.

3. A radiocommunication system comprising:

a base station which communicates with mobile stations using a plurality of Downbanded Cellular (DBC) channels, said DBC channels grouped into a plurality of blocks containing traffic and control channels, which are ranked based upon a relative likelihood of finding a DBC control channel in each block; and means, in said mobile stations, for investigating DBC channels in said blocks based upon said ranking.

4. The radiocommunication system of claim 3, wherein said plurality of DBC channels have center frequencies in the range between 851 and 869 MHz.

5. A method for locating a Downbanded Cellular (DBC) control channel in a radiocommunication system having a plurality of DBC channels comprising the steps of:

grouping said plurality of DBC channels into a plurality of blocks;

ranking each of said blocks based upon a relative likelihood of finding said DBC control channel therein;

reading a DBC channel within a highest ranked one of said blocks;

determining if said read DBC channel is a traffic channel; and continuing, if said read DBC channel is not a traffic channel, to read and determine DBC channels in said highest ranked one of said blocks until a DBC control channel is located.

6. The method of claim 5, wherein said plurality of DBC channels have center frequencies in the range between 851 and 869 MHz.

7. A method for locating a Downbanded Cellular (DBC) control channel among a plurality of DBC channels comprising the steps of:

grouping said plurality of DBC channels into a plurality of blocks;

ranking each of said blocks based upon a relative likelihood of finding said DBC control channel therein;

reading channels within a highest ranked block to locate a DBC control channel;

storing an identifier of said DBC control channel in a memory device;

storing identifiers of any subsequently acquired DBC control channels in said memory device; and using said stored identifiers in said memory device to locate a next DBC control channel.

8. The method of claim 7, wherein said plurality of DBC channels have center frequencies in the range between 851 and 869 MHz.

9. The method of claim 7, wherein said steps of storing further comprise the step of:

providing, as said memory device, a FIFO buffer wherein a predetermined number of previously acquired DBC control channel identifiers are stored.

10. The method of claim 5, wherein said step of determining if said read DBC channel is a traffic channel further comprises the steps of:

identifying a field in a time slot of a channel which is either a Coded Digital Verification Color Code (CDVCC) field or a Coded Superframe Phase (CSFP) field, depending upon whether said channel is a digital traffic channel or a digital control channel, respectively;

determining whether said field has check bits which are inverted relative to check bits of a digital traffic channel; and characterizing said channel as a digital control channel if said check bits are inverted, otherwise characterizing said channel as a digital traffic channel.

11. The method of claim 5, wherein said step of determining if said read DBC channel is a traffic channel further comprises the steps of:

receiving and decoding a field in a DBC channel which has been broadcast over an air interface;

determining if error correction bits in said field are inverted relative to a predetermined set of error correction bits; and identifying said DBC channel as a traffic channel or as a DBC control channel based upon said step of determining.

12. The method of claim 5, wherein said step of determining if said read DBC channel is a traffic channel further comprises the steps of:

identifying said DBC channel as a DBC control channel if a convolutional encoding rate of said DBC channel is a first rate and for identifying said DBC channel as a traffic channel if said convolutional coding rate is a second rate.

13. The method of claim 12, wherein said first rate is ¼ and said second rate is ½.

14. A mobile station comprising:

a transceiver for transmitting and receiving radio signals over an air interface;

a memory device including a first storage area for storing a probability block scheme and a second storage area for storing control channel identifiers;

a processor for acquiring a Downbanded Cellular (DBC) control channel using at least one of said probability block scheme stored in said first storage area and said control channel identifiers stored in said second storage area.

15. The mobile station of claim 14, wherein said processor first uses said stored control channel identifiers, if any, to acquire said DBC control channel and then, if unsuccessful, uses said probability block scheme to acquire said DBC control channel.

16. The mobile station of claim 14, wherein said DBC control channel has a center frequency between 851 MHz and 869 MHz.

17. The mobile station of claim 14, wherein said second storage area is a FIFO buffer.

* * * * *